United States Patent [19]
Larsen

[11] Patent Number: 5,662,335
[45] Date of Patent: Sep. 2, 1997

[54] PRESSURE BALANCED BELLOWS SEAL

[76] Inventor: Richard R. Larsen, 4153 Shady La., Cookeville, Tenn. 38501

[21] Appl. No.: 621,443

[22] Filed: Mar. 25, 1996

Related U.S. Application Data

[63] Continuation-in-part of Ser. No. 308,797, Sep. 19, 1994, abandoned.

[51] Int. Cl.⁶ .................................................. F16J 15/52
[52] U.S. Cl. ...................... 277/3; 277/200; 277/212 FB; 251/335.3
[58] Field of Search .................. 277/3, 200, 212 FB; 251/335.1, 335.3, 214

[56] References Cited

U.S. PATENT DOCUMENTS

| | | |
|---|---|---|
| 2,880,620 | 4/1959 | Bredtschneider . |
| 2,932,203 | 4/1960 | Peters .................................. 251/335.3 |
| 3,097,662 | 7/1963 | Peters . |
| 4,168,070 | 9/1979 | Tsuchihashi et al. . |
| 4,381,648 | 5/1983 | Balas, Jr. . |
| 4,482,091 | 11/1984 | Lawsing ............................... 251/335.3 |
| 4,483,665 | 11/1984 | Hauser . |
| 4,532,766 | 8/1985 | White et al. . |
| 4,858,437 | 8/1989 | Ochiai . |
| 4,889,350 | 12/1989 | Tranter . |
| 5,029,401 | 7/1991 | Masom . |

FOREIGN PATENT DOCUMENTS

| | | |
|---|---|---|
| 259285 | 10/1988 | Japan . |
| 26081 | 1/1989 | Japan .................................. 251/335.3 |
| 2041172 | 9/1980 | United Kingdom . |

*Primary Examiner*—Scott Cummings
*Attorney, Agent, or Firm*—James A. Hudak

[57] ABSTRACT

A pressure balanced bellows seal for a valve or pump is disclosed. The bellows seal includes a seal bellows assembly which is operatively and sealingly attached to the valve stem, a counterbellows assembly which is substantially concentric with the seal bellows assembly, a midplate which operatively joins the seal bellows assembly and the counterbellows assembly in an end-to-end arrangement, and an inert fluid within the cavity formed by the seal bellows assembly and the counterbellows assembly and which is moveable therebetween to compensate for volumetric changes resulting from the axial movement of the valve stem. The inert fluid balances the pressure of the process fluid and distributes it substantially uniformly against the seal bellows assembly and the counterbellows assembly thus substantially eliminating any pressure stresses within the bellows assemblies.

9 Claims, 3 Drawing Sheets

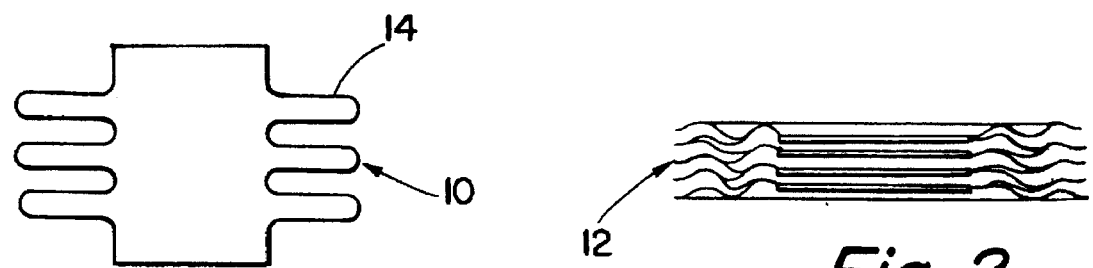
Fig. 1
(PRIOR ART)
Fig. 2
(PRIOR ART)
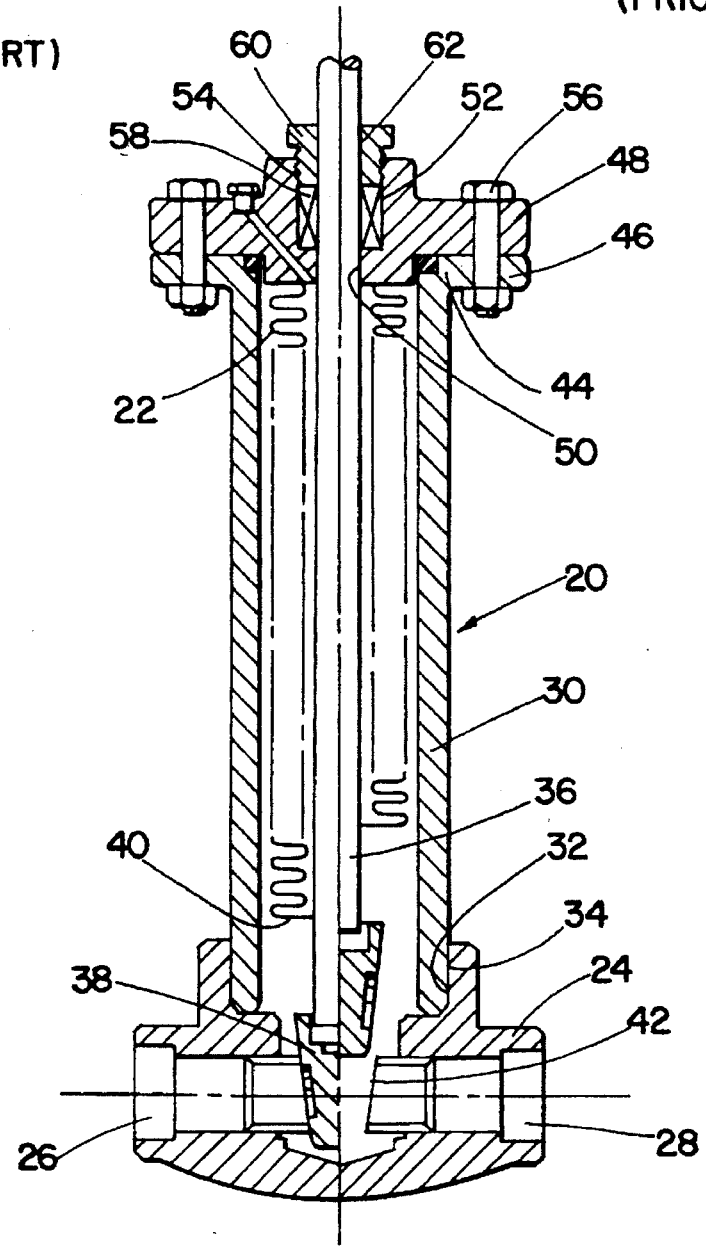
Fig. 3
(PRIOR ART)

5,662,335

PRESSURE BALANCED BELLOWS SEAL

This is a continuation-in-part of application Ser. No. 08/308,797 filed on Sep. 19, 1994, now abandoned.

TECHNICAL FIELD

The present invention relates, in general, to a bellows seal for a valve or pump, and, more particularly, to a bellows seal that is pressure balanced.

BACKGROUND ART

The use of a bellows seal within a valve, such as a gate valve, is very common. In such applications, high cycle life is very desirable, but is difficult to achieve because the valve is subjected to high and/or cyclical operating pressures. In order to achieve a high cycle life, the bellows must be thin and flexible. However, in addition to its function as a fluid barrier, the wall of the bellows typically acts as a pressure barrier between the process fluid and the atmosphere requiring that the wall of the bellows be relatively thick and less flexible, thus decreasing cycle life. Various approaches have been developed to pressure balance the bellows in order to overcome the foregoing problem. For example, in U.S. Pat. No. 4,381,648, the annular space between a pair of bellows is balanced with a liquid maintained at a pressure slightly below the working fluid of a Stirling engine by means of an external pressure regulator. U.S. Pat. No. 4,532,766, which is directed to another Stirling engine application, teaches the use of a smaller bellows interposed between the working gas and a pressure compensating fluid to transmit the working gas pressure to the compensating fluid and thus to the seal bellows. In this latter application there is a requirement that the effective area of the seal bellows matches that of the piston which it seals. Such a dependency is unrealistic because under dynamic operating conditions, pressure drops can occur through the serpentine path of the pressure balancing circuit and the fluid make-up circuits. Any differential pressure across the seal bellows will be momentarily amplified because of the shift in the effective area of the bellows. The piston, however, will not change in effective area resulting in a differential area between the seal bellows and the piston. The differential area increases the pressure on the smaller bellows which transmits the pressure to the seal bellows causing a momentary pressure spike on the seal bellows. This ability of a bellows to change effective area in response to a pressure differential is well known in the art.

Another method for pressure balancing a bellows assembly is disclosed in U.S. Pat. No. 4,483,665 which teaches the use of the air that drives the piston, which is in communication with the pumping bellows, to also apply pressure to the outer diameter of the bellows assembly. In this case, the piston is larger than the bellows assembly creating a pressure amplifier. The pressure of the process fluid through the bellows assembly is greater than the air which drives the piston resulting in the bellows assembly being only partially pressure balanced. To achieve complete pressure balancing, the bellows assembly must be in close communication with the pressure-balancing bellows and there can be no tendency to shift the effective area of the bellows assembly as a result of pressure differentials.

Another method for pressure balancing a bellows assembly is disclosed in U.S. Pat. No. 4,889,350 in which a rotary shaft seal and a pair of bellows having different effective areas are connected serially to produce a system with two different effective areas for the Bellows depending upon the direction and magnitude of the differential pressure across the seal. When pressure is greater externally, the larger bellows contracts until the mechanical stop bottoms and renders the larger bellows inactive. When pressure is greater internally, the smaller bellows bottoms and becomes inactive. The objective is to balance the pressure on the seal nose of the active face seal rings to either an internal or an external pressure.

Another bellows pressure balancing method is disclosed in U.S. Pat. No. 2,880,620 in which a pair of bellows of differential area seal a valve stem. In this invention, the lower end of a smaller bellows is attached to the valve stem and the upper end of a larger bellows is attached to the upper end of the smaller bellows and is positioned concentric with, and physically over the outside of, the small bellows " . . . in telescoped assembly . . . " The lower end of the larger bellows is attached to the valve bonnet. The space between the outside of the larger billows and the inside of the bonnet, and the inside of the smaller bellows and the valve stem is filled with an incompressible liquid. The stem passes through the incompressible liquid and through the top of the bonnet via a packing gland. This system effects true pressure balance of the two bellows, but has the distinct disadvantage that the telescopic arrangement of the two bellows creates a deep, convoluted trap for particulates, fine silts and precipitable materials common to many of the chemicals that such a zero leakage seal would contain. For example, petroleum pumped from a well will often contain natural gas (a volatile organic compound—VOC) that must be controlled from entering the atmosphere per the Clean Air Act Amendments (CAAA), and will also commonly contain fine silts and larger particulates that can migrate by force of the swirling currents that occur in the bonnet of a valve, and be deposited in the deep regions between opposing bellows convolutions, causing them to fill and become inoperable. Certain hazardous chemicals, such as ethylene, also requiring zero leakage valves per the CAAA, can form precipitates in the cooler upper regions of the valve bonnet where there is reduced fluid motion as would occur in the deep recesses between two adjacent convoluted bellows. As with the fine silts, precipitates between the convolutions of the two bellows can build to prevent the bellows from moving during valve closure. In both cases, with an accumulation of foreign matter occurring between the two bellows while the valve is open and the system is flowing, subsequent closing of the valve can have catastrophic results. As the outer edges of the inner bellows convolutions descend and attempt to pass the inner edges of the outer bellows which are rising, trapped material can lock the thin, relatively frangible convolutions, resulting in only the short section of lowermost convolutions opening. The excessive stretching of the lowermost convolutions can cause permanent distortion at best, and catastrophic tearing at worst, resulting in premature failure and permanent leakage of the process fluid into the upper chamber, and contamination of the process fluid by the incompressible fluid. The seal ceases to be a zero leakage device, and the process fluid, by virtue of its greater pressure, will be forced through the torn bellows and past the packing, as is common in valves with packing only. This problem can be averted by constructing the seal where the two bellows are not telescoped one outside of the other, but rather are arranged end-to-end.

In view of the foregoing, it has become desirable to develop a bellows seal assembly for a valve or pump wherein the bellows seal is fully pressure balanced permitting virtually any pressure to be applied thereto, whether the pressure is static, cyclical, pulsating, or in surges or spikes, without damage to or reduction in the cycle life of the bellows. It is further desirable that the two pressure balanced bellows be arranged so as not to trap particulates, fine silts and precipitates between the two bellows where they could lock up, but to arrange them so that one is positioned away from the other while retaining a sealable connection therebetween.

SUMMARY OF THE INVENTION

The present invention solves the problems associated with the prior art and other problems by providing a seal for a valve or a pump including a seal bellows assembly which is operatively and sealingly attached to the valve stem, a counterbellows assembly which is substantially concentric with the seal bellows assembly and arranged in an end-to-end configuration to prevent buildup of particulates, fine silts or precipitates, a midplate which operatively and sealably joins the seal bellows assembly and the counterbellows assembly, and an inert, relatively non-compressible fluid within the cavity formed by the seal bellows assembly and the counterbellows assembly and which is movable therebetween to compensate for volumetric changes resulting from axial movement of the valve stem and thus the seal bellows assembly within the valve or pump. Since the inert fluid (the equilant) within the seal bellows assembly and the counterbellows assembly is relatively non-compressible, the equilant balances the pressure of the process fluid and distributes it substantially uniformly against the seal bellows assembly and the counterbellows assembly thus substantially eliminating any pressure stresses within the foregoing bellows assemblies. Constructing the two bellows in an end-to-end arrangement eliminates the deep, convoluted trap between the two telescoped bellows of aforementioned construction, thereby preventing conveyed solids from accumulating and bridging between the two bellows where the bellows convolutions could become locked into the adjacent convolutions of the neighboring bellows resulting in catastrophic failure at some later time when the valve is closed. Because of the close communication of the seal bellows assembly with the counterbellows assembly, because the bellows system is engulfed in liquids on both sides, and because of the resulting low mass of the seal system including the midplate, the natural frequency of the system is relatively high, making the system responsive to the briefest pressure spikes that ordinarily occur in a fluid system. The rapid, almost instantaneous response to pressure changes prevents shifts in the effective areas of the bellows assemblies, thereby maintaining pressure balance under all conditions. In this manner, the effects of stresses caused by pressure on the seal bellows assembly and the counterbellows assembly is minimized.

BRIEF DESCRIPTION OF THE DRAWINGS

FIG. 1 is a front elevational view of a typical formed bellows assembly.

FIG. 2 is a cross-sectional view of a typical welded bellows assembly.

FIG. 3 is a cross-sectional view of a conventional gate valve illustrating the position of a formed bellows assembly therein when the valve is in the open position and in the closed position.

DESCRIPTION OF THE PREFERRED EMBODIMENT

Figure 4:
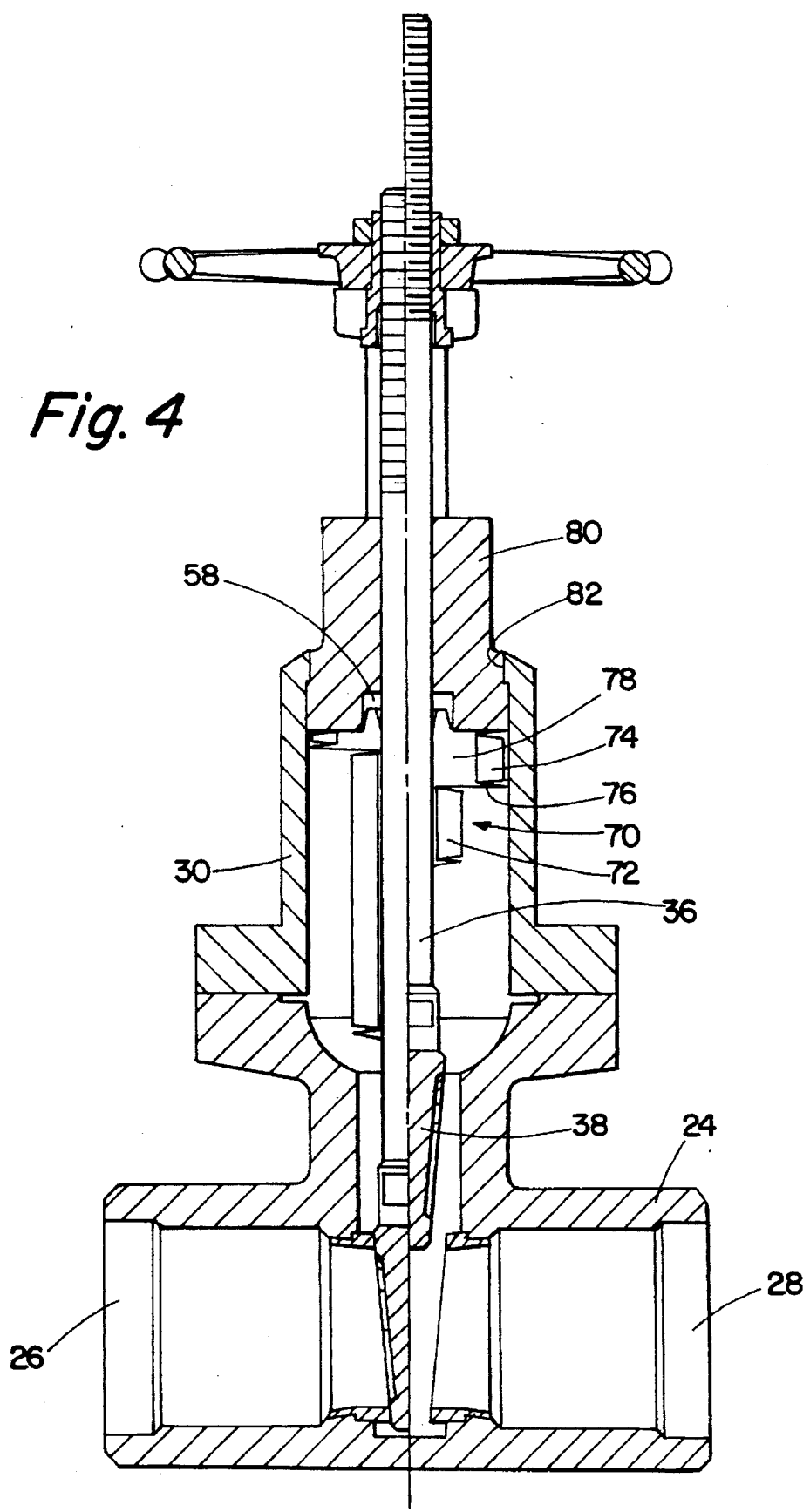
FIG. 4 is a cross-sectional view of the present invention within a conventional gate valve where the non-compressible fluid is internal to the two bellows, and the bellows are arranged in an end-to-end configuration.

Referring now to the figures where the illustrations are for the purpose for describing the preferred embodiment of the present invention and are not intended to limit the invention described herein, FIG. 1 is a front elevational view of a typical formed bellows assembly 10, whereas FIG. 2 is a cross-sectional view of a typical welded bellows assembly 12, both bellows assemblies being of the prior art but used in a new configuration in the present invention. Bellows, by their design, are flexible because they are constructed of thin membranes. Referring to FIG. 1, in the formed bellows assembly 10, which is formed from a metallic material, the membrane is called a free plate, shown generally by the numeral 14, and two adjacent free plates and their respective inner and outer bends are known as a convolution. In the formed bellows assembly 10, the greater portion of the wall that is free to flex is of a generally planar shape, and, in flexing, changes from the planar shape to a shallow conical shape. With respect to the welded bellows assembly 12 shown in FIG. 2, the metallic members are called diaphragms, and a welded pair of diaphragms is referred to as a convolution. Whether the bellows assembly is formed from free plates or diaphragms, the resulting walls are relatively thin and their thickness ranges from 0.002 inches to 0.010 inches. However, when either type of bellows is used in a conventional valve seal, it is often made of multiple layers, up to five layers thick, to make it strong enough to resist process pressures. This greatly increases the stiffness of the bellows, requiring the bellows to have numerous convolutions to obtain flexibility. In addition, the numerous convolutions cause the conventional bellows seal to be very long—typically 3 to 4 times the length of the bellows seal of the present invention. The length of the conventional bellows seal also presents clearance problems in upgrading existing valves to comply with new Environmental Protection Agency requirements, obviating their use in many applications. In the case of the welded bellows assembly 12, the overall configuration is much more complex since each diaphragm has a shallow ripple formed therein.

It is possible to design either the free plate or diaphragm so that flexing of same causes a stress that is below the endurance limit of the material comprising the respective bellows assembly. Flexing of the free plate or diaphragm below the endurance limit allows flexural life of the bellows to become infinite. This is very unlikely, however, when pressure is applied across the wall of the free plate or diaphragm as occurs in bellows seals that are not pressure balanced because when pressure stress is combined with the bending stress of flexing, the stresses are generally well above the endurance limit of the subject material.

Referring now to FIG. 3, a cross-sectional view of a conventional gate valve 20 sealed with a formed bellows assembly 22 is illustrated. Gate valve 20 includes a valve body 24 having an inlet 26 and an outlet 28, an elongated tubular bonnet 30 connected at one end 32 to a recess 34 provided in valve body 24 and shown oriented so that the longitudinal axis of the tubular bonnet 30 is substantially perpendicular to the longitudinal axis which passes through the inlet 26 and the outlet 28 of the valve body 24. A valve stem 36 having a gate 38 attached to one end thereof is received within the elongated tubular bonnet 30 and through the formed bellows assembly 22. The bottom end 40 of the bellows assembly 22 is attached to the valve stem 36 in a spaced-apart relationship with respect to the gate 38. Gate 38 of valve stem 36 is receivable in a seat 42 provided within valve body 24 and interposed between inlet 26 and outlet 28 provided in body 24. The opposite end 44 of the elongated tubular bonnet 30 is formed into a flange 46. A cap member 48 having a bore 50 and concentric counterbores 52 and 54 formed therein is receivable on flange 46 and is attached thereto by a plurality of bolts 56, typically located on a bolt circle. Packing material is provided within counterbore 52 forming a seal 58 and is maintained therein by a packing gland 60 having a bore 62 therethrough. Valve stem 36 is received through bore 50 in cap member 48, the packing material 58, and bore 62 in packing gland 60. Valve stem 36 and gate 38 are shown in their retracted or valve open position (right hand portion of valve stem 36 and gate 38) and in their extended or valve closed position (left hand portion of valve stem 36 and gate 38). When the gate valve 20 is in the open position, the formed bellows assembly 22 is subjected to the pressure of the fluid flowing through the valve 20. When fluid pressure is applied across the free plate wall of the formed bellows assembly 22, the wall flexes in a balloon-like fashion. This flexing introduces stresses in the formed bellows assembly 22 which are concentrated near the inner diameter and outer diameter of the bellows. Subsequent stretching or compression of the bellows creates additional stresses which are added to or subtracted from the stresses caused by pressurization. These combined stresses determine the number of flexures and/or pressure cycles that the bellows will withstand. In valve applications, the flexing of the bellows is essential, and pressure is always involved. If one of these sources of stress could be eliminated, bellows cycle life would be greatly improved. The present invention effectively eliminates the stress due to pressurization by causing the bellows to always be subjected to an equal and balancing pressure on both sides of the free plate or diaphragm. Without the stress caused by pressure, is possible to design a bellows having a very high and predictable cycle life. In addition, when the pressure is balanced across the bellows, virtually any pressure can be applied to the bellows without damage or reduction in life. The present invention also retains the advantages of the original bellows seal of FIG. 3 in that its two bellows, while of differing diameters to achieve pressure balance as in U.S. Pat. No. 2,880,620, are arranged end-to-end to eliminate the adjacent bellows convolutions of telescoping construction that must move in opposite directions, and that induce bellows lock-up from particulates, fine silts and precipitates.

Referring now to FIG. 4, the pressure balanced bellows seal 70 of the present invention is illustrated within a conventional gate valve. In this Figure, those elements which are similar to the elements shown in the prior art carry like reference numerals and will not be discussed further. The bellows seal 70 replaces the formed bellows assembly 22 and is comprised of a seal bellows assembly 72, a counterbellows assembly 74 arranged in end-to-end relationship with the seal bellows assembly 72 and joined by a midplate 76, and a pressure balancing, or pressure equalizing or pressure transfer fluid, hereinafter referred to as the equilant 78 to simplify reference thereto. It should be noted that the seal bellows assembly 72 and the counterbellows assembly 74 illustrated in this Figure and in the alternate embodiment of the present invention shown in the succeeding Figure utilize the usual symbolism in the industry, i.e., with a short "v" for the diaphragms at each end of each bellows assembly rather than showing all of the convolutions in each bellow assembly. The foregoing was done to simplify and clarify the Figures. In addition, it should be noted that even though this Figure and the alternate embodiment of the present invention shown in FIG. 5 utilize welded bellows assemblies, formed bellows assemblies can be readily substituted for the welded bellows assemblies in each embodiment since the principles of the present invention are equally applicable to welded bellows assemblies as well as formed bellows assemblies.

The seal bellows assembly 72 forms a seal against the valve stem 36 and travels axially in compliance with the stem. The seal bellows assembly 72 is similar to the seal bellows presently used on the rising stem valves of the prior art except that, in the present invention, it is pressure compensated or balanced. In the present invention, the lower end of the counterbellows assembly 74 is operatively, sealably and concentrically attached end-to-end to the upper end of the seal bellows assembly 72 by the midplate 76.

The counterbellows assembly 74 is interposed between the midplate 76 and a cap 80 received within end 82 of bonnet 30. The counterbellows assembly 74 accumulates equilant 78 displaced by the seal bellows assembly 72 as it is compressed as a result of axial movement of the valve stem 36 during opening of the valve and returns equilant 78 to the seal bellows assembly 72 as the seal bellows assembly 72 subsequently returns to its original position. In this manner, the counterbellows assembly 74 permits axial movement of the seal bellows assembly 72 while maintaining constant fluid volume of the equilant 78 therein. In essence, the counterbellows assembly 74 equalizes the pressure exerted on the seal bellows assembly 72 by the process fluid passing through the gate valve by delivering the pressure of the process fluid to the equilant 78. In so doing, the counterbellows assembly 74 also equalizes the pressure across its own walls. In actuality, the counterbellows assembly 74 balances the pressure across the seal bellows assembly 72 and across itself. The counterbellows assembly 74 also provides a small buffer of equilant 78 to accommodate any volumetric change of the seal 58 and other components of the bellows seal system as each undergoes deformation caused by the application of pressure thereto by the process fluid. In addition, the counterbellows assembly 74 provides a buffer of equilant 78 to prolong seal performance as trace amounts of equilant 78 are inevitably lost past seal 58 during long-term valve operation. The counterbellows assembly 74 also provides a hermetic seal with the bellows seal 70 and the midplate 76. Lastly, the counterbellows assembly 74 allows for thermal expansion and contraction of the equilant 78 when the gate valve is used in high temperature applications.

The midplate 76 is a ring-shape disc that operatively and sealably joins the lower end of the counterbellows assembly 74 to the upper end of the seal bellows assembly 72. In the welded bellows construction, the midplate is a relatively thin (0.010 inches–0.020 inches) metallic disc fabricated from the same material as the seal bellows assembly 72 and the counterbellows assembly 74 and welded to the ends of both assemblies.

The equilant 78 is an equipoisal, or pressure balancing, or pressure equalizing, or pressure transfer fluid. The equilant 78 completely fills the volume bounded by the inner surface of the counterbellows assembly 74, the midplate 76, the inner surface of the seal bellows assembly 72, the termination that attaches the seal bellows assembly 72 to the valve stem 36, the surface of the valve stem 36, the seal 58, and the surface of the portion of cap 80 that is within the counterbellows assembly 74. Process fluid pressure is exerted against the equilant 78 against the midplate 76 which spans the differential area between the seal bellows assembly 72 and the counterbellows assembly 74 and is contained by the seal 58. Without the presence of the equilant 78, pressure against the midplate 76 would compress the counterbellows assembly 74 until it reached solid height, at which point the midplate 76 would begin to distort and both the seal bellows assembly 72 and the counterbellows assembly 74 would be over-pressurized. The equilant 78 can be any one of a variety of relatively incompressible fluids, such as petroleum-based oils, silicone oil, fluorosilicone oil, water-based solutions, heat transfer fluids, or a variety of greases or gels. A fill and seal port (not shown) is utilized to introduce the equilant 78 into the bellows seal 70 and is located in the cap 80 and includes a means for sealing and containing the pressure of the equilant 78. After assembly of the bellows seal 78, the fill and seal port is used to evacuate and backfill the seal 70 with the appropriate fluid, and then permanently sealed.

In the preferred embodiment of the present invention, the seal 58, which is the pressure barrier in the seal system, is a polymeric, spring-energized, chevron seal, but it could be any type of high-integrity, low leakage packing material. The selection of the packing material depends upon operating conditions. The seal 58 provides a sliding sealing surface against the valve stem 36 and acts as a secondary seal in case of failure of either the seal bellows assembly 72 or the counterbellows assembly 74. While the seal 58 alone could provide a sealing surface for the valve, corrodants in the process fluid would damage the sliding surface of the valve stem which would, in turn, damage the packing material forming seal 58. In the present invention, the bellows assemblies protect the sliding surface of the valve stem at all times, and the seal 58 relieves the bellows assemblies of pressure load.

Figure 5:
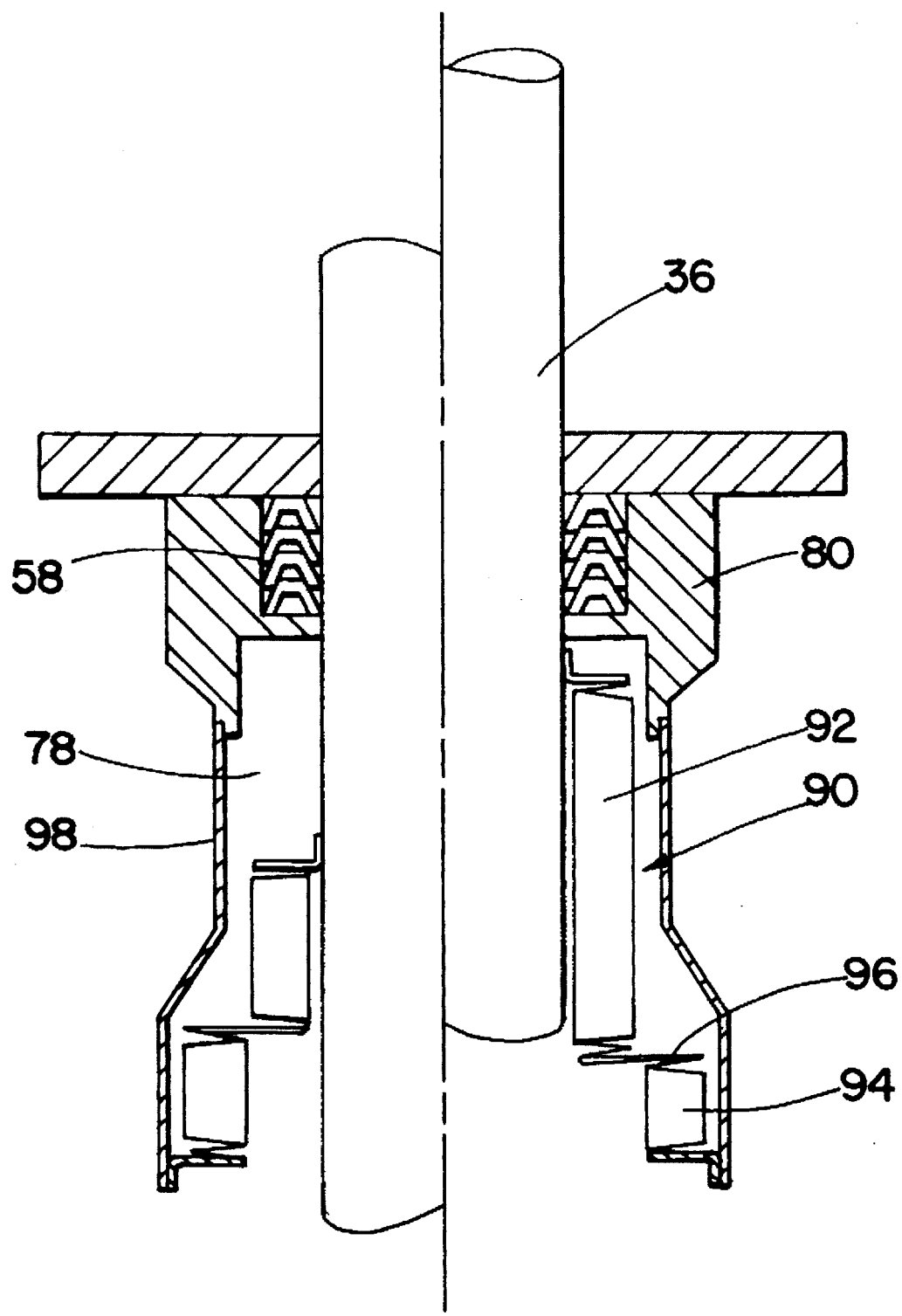
FIG. 5 is a cross-sectional view of another embodiment of the present invention where the non-compressible fluid is external to the two bellows and the bellows are arranged in an end-to-end configuration.

An alternate embodiment of the present invention is illustrated in FIG. 5. In the seal assembly 90 shown in FIG. 5, the seal bellows assembly 92 and the counterbellows assembly 94 are connected end-to-end and concentric with one another. In this case, the midplate 96 interconnects the lower end of the seal bellows assembly 92 with the upper end of the counterbellows assembly 94 and a housing 98 interconnects cap 80 with the lower end of counterbellows assembly 94. In this case the equilant 78 is retained by seal 58, cap 80, housing 98 and counterbellows assembly 94, and is external to both the seal bellows assembly 92 and the counterbellows assembly 94. In this configuration, the process fluid is exposed to the inside diameter of both bellows assemblies rather than to the outside of the bellows assemblies, as shown in FIG. 4, but the construction still eliminates the undesirable condition of adjacent, telescopic bellows that must pass each other in opposing motion, and that can trap particulates and lock together. This configuration is occasionally a more convenient construction for control valves where more room tends to be available near the lower part of the bonnet to accommodate the wider footprint of the counterbellows assembly. This configuration also has the added advantage of cancelling stresses induced by the slight pressures caused by the spring force of the bellows, although these forces are usually negligible.

In summary, the seal of the present invention utilizes two bellows assemblies having different effective areas, sealably and operatively interconnected in an end-to-end arrangement to achieve a pressure balancing effect across the convolutions of both bellows when pressurized by a process fluid. By pressure balancing the bellows assemblies with this configuration, the following advantages are realized:

1) The resulting seal has minimal leakage, is termed a "zero-emission" seal by the Environmental Protection Agency, and meets current and future requirements for emissions set forth by the EPA;

2) The seal has an extremely long cycle life that is predictable and not sensitive to pressure;

3) The seal has the ability to withstand high pressures, surges, pulsations and cyclical pressure changes considered to be in the upper range or beyond for metallic bellows;

4) The seal provides a reduced stem actuation force equal to the valve stem area multiplied by the operating pressure which is the same as for conventionally packed valves (this advantage is extremely important—the valve does not require a larger, more expensive actuator that is typically needed by a conventional bellows seal);

5) The seal has a significantly shorter bonnet length (one-half to one-third of that of a conventional bellows seal) due to the thinner bellows walls, lower spring rate and fewer convolutions required;

6) The seal has a much lower (one/tenth) operation force due to a greatly reduced bellows spring rate;

7) The seal allows the use of the most highly corrosion resistant alloys, such as Hastelloy C276 and C22, which are normally not usable because their low strength cannot tolerate operating pressures typical of valves; and 8) The seal, by virtue of the bellows end-to-end configuration, eliminates buildup of particulates, fine silts and precipitates between adjacent convolutions of a telescopic construction that could unknowingly cause the adjacent convolutions to lock together resulting in catastrophic failure upon subsequent attempts to close the valve.

Certain modifications and improvements will occur to those skilled in the art upon reaching the foregoing. It should be understood that all such modifications and improvements have been deleted herein for the sake of conciseness and readability but are properly within the scope of the following claims.

I claim:

1. A bellows seal assembly for containing process fluid under pressure in a valve comprising:

a first bellows assembly;

a second bellows assembly substantially concentric with said first bellows assembly;

means sealably interconnecting said first bellows assembly and said second bellows assembly in an end-to-end arrangement and preventing a telescoping relationship therebetween;

a substantially incompressible pressure balancing fluid contacting an inner periphery of said first and second bellows assemblies said process fluid contacting an outer periphery of said first and second bellows assemblies;

said first bellows assembly sealably attached to actuating means;

said second bellows assembly sealably attached to housing means; and whereby displacement of said actuating means causes displacement of said first and second bellows assemblies while maintaining a pressure balance between said incompressible pressure balancing fluid and said process fluid.

2. The bellows seal assembly as defined in claim 1 wherein said first bellows assembly is sealably attached at one end thereof to said actuating means and is sealably attached at the other end thereof to said second bellows assembly forming said end-to-end arrangement.

3. The bellows seal assembly as defined in claim 2 wherein said other end of said first bellows assembly is sealably attached to an end of said second bellows assembly by said interconnecting means.

4. A bellows seal assembly for containing process fluid under pressure in a valve comprising:

a first bellows assembly;

a second bellows assembly substantially concentric with said first bellows assembly;

means sealably interconnecting said first bellows assembly and said second bellows assembly in an end-to-end arrangement and preventing a telescoping relationship therebetween;

a substantially incompressible pressure balancing fluid received within and contacting an inner periphery of said first and second bellows assemblies said process fluid contacting an outer periphery of said first and second bellows assemblies;

said first bellows assembly sealably attached to actuating means;

said second bellows assembly sealably attached to housing means; and whereby displacement of said actuating means causes displacement of said first and second bellows assemblies while maintaining a pressure balance between said incompressible pressure balancing fluid and said process fluid.

5. The bellows seal assembly as defined in claim 4 wherein said first bellows assembly is sealably attached at one end thereof to said actuating means and is sealably attached at the other end thereof to said second bellows assembly forming said end-to-end arrangement.

6. The bellows seal assembly as defined in claim 5 wherein said other end of said first bellows assembly is sealably attached to an end of said second bellows assembly by said interconnecting means.

7. A bellows seal assembly comprising:

a first bellows assembly;

a second bellows assembly substantially concentric with said first bellows assembly;

means sealably interconnecting said first bellows assembly and said second bellows assembly in an end-to-end arrangement and preventing a telescoping relationship therebetween;

a housing substantially surrounding said first bellows assembly and said second bellows assembly;

a substantially incompressible pressure balancing fluid received within said housing;

said process fluid contacting an inner periphery of said first and second bellows assemblies;

said first bellows assembly sealably attached to actuating means;

said second bellows assembly sealably attached to said housing; and whereby displacement of said actuating means causes displacement of said first and second bellows assemblies while maintaining a pressure balance between said incompressible pressure balancing fluid and a process fluid.

8. The bellows seal assembly as defined in claim 7 wherein said first bellows assembly is sealably attached at one end thereof to said actuating means and is sealably attached at the other end thereof to said second bellows assembly forming said end-to-end arrangement.

9. The bellows seal assembly as defined in claim 8 wherein said other end of said first bellows assembly is sealably attached to an end of said second bellows assembly by said interconnecting means.

* * * * *